United States Patent [19]
Hershey et al.

[11] Patent Number: 5,926,467
[45] Date of Patent: Jul. 20, 1999

[54] METHOD AND APPARATUS FOR DOPPLER BASED MULTIPLE ACCESS COMMUNICATION CONTROL

[75] Inventors: John Erik Hershey, Saratoga; Irfan Ali; Naofal Mohammad Wassel Al-Dhahir, both of Schenectady; Gary Jude Saulnier, Saratoga, all of N.Y.; Robert Gordon Nelson, Ocean City, N.J.

[73] Assignee: General Electric Company, Schenectady, N.Y.

[21] Appl. No.: 08/779,152

[22] Filed: Jan. 3, 1997

[51] Int. Cl.⁶ .................................................. H04B 7/204
[52] U.S. Cl. .................... 370/319; 370/316; 370/324; 370/503
[58] Field of Search .................... 370/316, 324, 370/503; 342/99, 402, 405, 418

[56] References Cited

U.S. PATENT DOCUMENTS

| | | | |
|---|---|---|---|
| 5,515,062 | 5/1996 | Maine et al. | 342/457 |
| 5,644,572 | 7/1997 | Olds et al. | 370/324 |
| 5,659,545 | 8/1997 | Sowles et al. | 370/324 |
| 5,731,785 | 3/1998 | Lemelson et al. | 342/357 |
| 5,790,939 | 8/1998 | Malcolm et al. | 455/13.2 |

*Primary Examiner*—Jeffery A. Hofsass
*Assistant Examiner*—Mitchell Slavitt
*Attorney, Agent, or Firm*—Whitham, Curtis & Whitham

[57] ABSTRACT

A single, simple but multi-moded protocol for implementation on different data transportation Low Earth Orbit (LEO) systems uses a Doppler-Based Multiple Access (DBMA) system to assign transmission times for responding transceivers. The Doppler frequency shift observed at the transceivers is used to control transmissions from them such that the system is at its maximum capacity limit at all times.

14 Claims, 15 Drawing Sheets

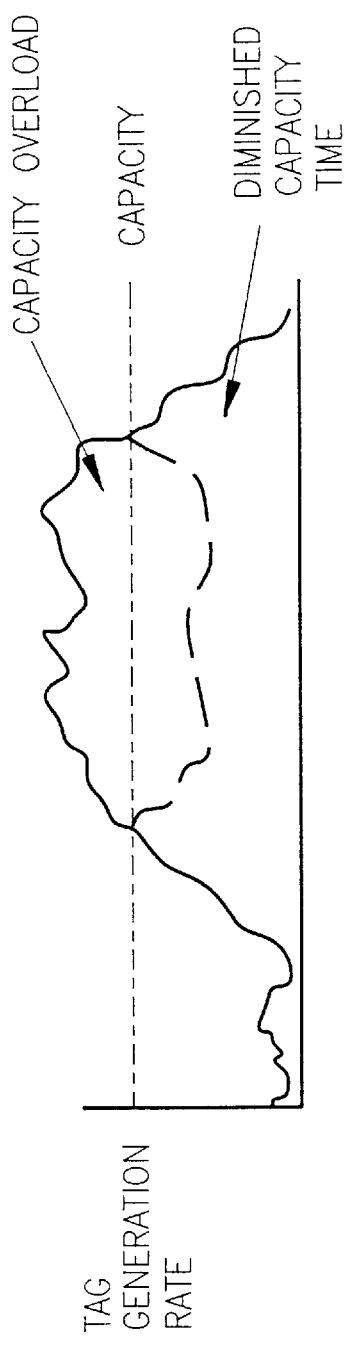
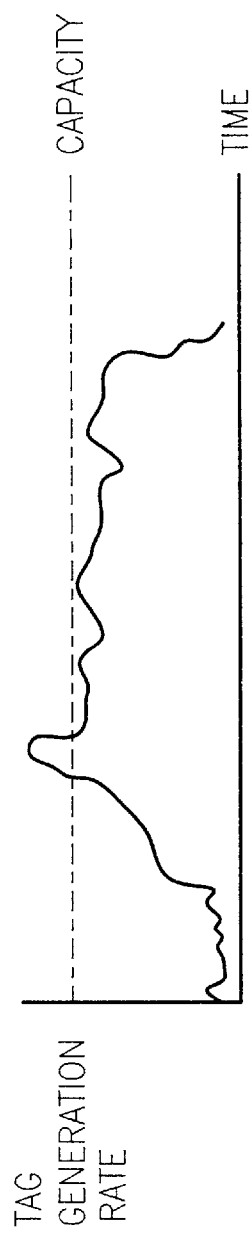
FIG. 1A
FIG. 1B
FIG. 1C

METHOD AND APPARATUS FOR DOPPLER BASED MULTIPLE ACCESS COMMUNICATION CONTROL

BACKGROUND OF THE INVENTION

1. Field of the Invention

The present invention generally relates to multiple access communications control in a Low Earth Orbit (LEO) satellite system composed of satellites that transpond, in real time, transmissions received in the uplink frequency band. These transmissions may or may not be filtered in order to remove unwanted noise before frequency translation and retransmission. It is also assumed that these satellites continually broadcast a beacon on the "outbound" data channel in addition to the "bent pipe" transponder.

2. Background Description

The tracking and location of assets such as railcars, shipping or cargo containers, trucks, truck trailers, automobiles, etc., can be highly advantageous in commerce. Precise tracking of such vehicles and objects can facilitate their being allocated and positioned in an efficient manner, and can provide for immediate, accurate localization of lost, delayed or damaged assets. In one such system, a central facility or station must track multiple assets (e.g., railcars). Each tracked object carries a TAG that contains a transmitter for communicating with a central station.

In another application, TAGs may be attached to widely distributed nodes in a system, such as a power generation system, gas distribution system, and the like. These nodes may produce data or status information that needs to be transmitted to the central station.

The TAGs may be quite remote from the central station that monitors them, and therefore some type of transponder is required to relay the transmissions from the TAGs. The low complexity/modest capacity low earth orbiting satellites, or little LEOs (LLEOs) as they are nomenclated, will play an important role in the transportation and management of many earth bound assets through the TAGs associated with these assets. The key defining measure of the viability of a little LEO/TAG system is the system capacity, as this is the item that can be metered and sold. In turn, one of the key defining parameters of capacity is the communications transport protocol. It is the capacity that determines the upper limit of the revenue value. This protocol must be designed with good and relatively complete knowledge of the user data generation statistics; e.g., how many users are there, how are they geographically distributed, what are their generation rates dependent upon, and so forth. Second, the protocol must be developed knowing the channel. And third, the protocol must be developed to provide adequate error control.

One method of operation is to have the ground based units (i.e., TAGs) transmit when:

i. the satellite is at a maximum elevation with respect to the TAG, and ii. the satellite is also near a maximum elevation with respect to a ground control station which serves to collect the inbound transmissions from the TAGs and to broadcast the outbound transmissions to the TAGs.

In order for this to work, TAGs must have some means for determining satellite elevation.

SUMMARY OF THE INVENTION

It is therefore an object of the present invention to provide a single, simple but multi-moded protocol for many of the different data transportation service candidates for a little LEO/TAG system.

According to this invention, a Doppler-Based Multiple Access (DBMA) is implemented. The idea behind DBMA is to use the Doppler frequency shift observed at the TAGs to control transmissions from them such that the system TAG message generation rate does not exceed its maximum capacity limit at any times; i.e., it serves as many TAGs as possible.

It is also an object of this invention to provide a method by which the TAGs in specific areas may be selected for transmission.

To illustrate the idea, DBMA functions are sketched in FIGS. 1A, 1B and 1C. FIG. 1A displays the TAG generation rate as the satellite passes over the TAGs. The TAG message generation rate varies with time due to two factors: (1) the stochastic process of message arrivals at individual TAGs, and (2) the satellite's relative position with time with respect to the TAGs. TAGs in new areas become visible to the satellite and others which were visible become invisible. For some areas, there is a high density of TAGs that wish to transmit and, unless they are controlled, the TAG message generation rate can exceed the system capacity as indicated.

There are two effects from such an overload. First, the TAG transmissions above capacity are surely lost and second, and perhaps most deleterious to the system, the interference introduced by the TAG transmissions above capacity raises background noise levels and thereby increases the probability of errors in all TAG transmissions. The expected number of collisions is also increased. This overload situation can result in a serious diminution of capacity.

FIG. 1B is a "Doppler/Time" flow control which controls, in a novel way, the TAG message generation rate.

FIG. 1C shows the effect of the "Doppler/Time" flow control on the TAG message generation rate. Note that it is brought to near capacity and thus provides a more nearly optimal use of the satellite asset and increases its utilized capacity.

The process according to the invention is composed of two subprocesses; one at the TAG and one at the central station. At the TAG:

As a satellite comes into common view of a TAG and the central station, the TAG determines:
  i. the expected maximum elevation of the satellite to the TAG, and
  ii. the time to the maximum elevation of the satellite.

the TAG monitors the central station outbound link to determine the TAG's eligibility to transmit should it have a message waiting in the transmit queue. This eligibility is based on an allowable window for start of transmission with allowable limits on.
  i. the maximum elevation of the satellite, and
  ii. a time interval centered at the time of the satellite's maximum elevation.

If the TAG has a message to transmit and if it is eligible to transmit during the present satellite pass, the TAG selects a start transmission time at random within the available time window of eligibility.

At the central station:

The central station has a limited number of receiver units which it allocates on a per unit basis to each TAG transmission. If the number of incoming TAG transmissions exceeds this number, then those TAG messages which are not assigned a receiver unit will be lost and further result in a greater multiple access interference (MAI) noise potentially degrading the transmissions processed by the appropriated receiver units.

The central station monitors the TAG transmission rate. If this rate exceeds the capability of the central station to process this rate, the central station reduces the window of eligibility for transmissions and broadcasts this restriction. The central station may control the window of eligibility by allowing TAGs to transmit only if the maximum angle of elevation falls within a tighter set of limits. The central station may also adjust the TAG transmission rate by changing limits of the time window around the time of maximum elevation.

BRIEF DESCRIPTION OF THE DRAWINGS

The foregoing and other objects, aspects and advantages will be better understood from the following detailed description of a preferred embodiment of the invention with reference to the drawings, in which:

FIGS. 1A, 1B, and 1C are graphs showing the function of the DBMA;

DETAILED DESCRIPTION OF A PREFERRED EMBODIMENT OF THE INVENTION

Figure 2:
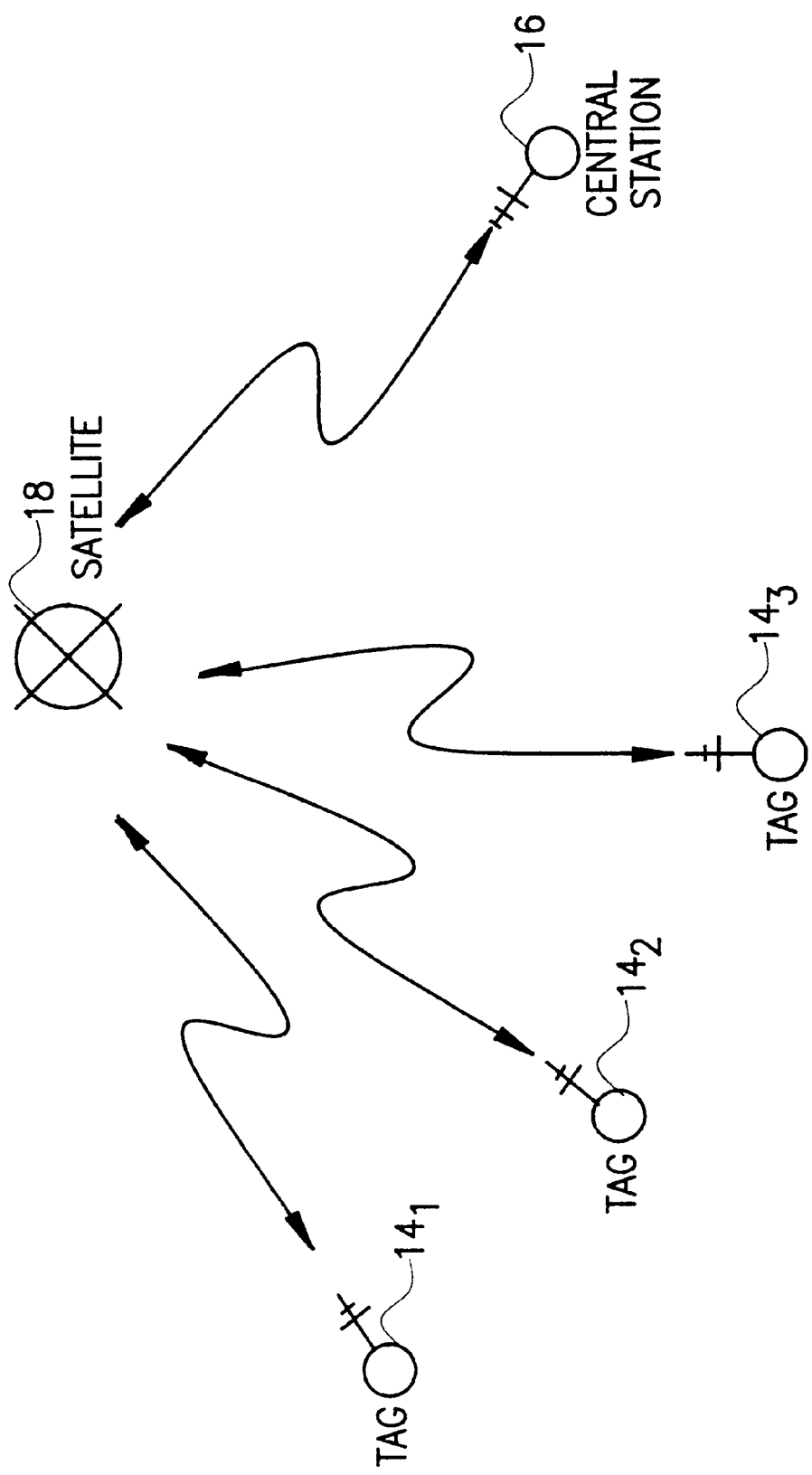
FIG. 2 is a block diagram showing one satellite of a LEO system in common view of a plurality of TAGs and the central station.

Referring again to the drawings, and more particularly to FIG. 2, there is shown a central station 16 which is quite remote from the TAGs $14_1$, $14_2$ and $14_3$ being monitored, requiring a transponder to relay TAG transmissions to the central station. In the practice of this invention, the transponder is a Low Earth Orbit (LEO) satellite 18. The satellite 18 is one of many such satellites in the LEO system. For purposes of this illustration, a single satellite 18 in common view of TAGs $14_1$, $14_2$ and $14_3$ and the central station 16 is shown.

Figure 3:
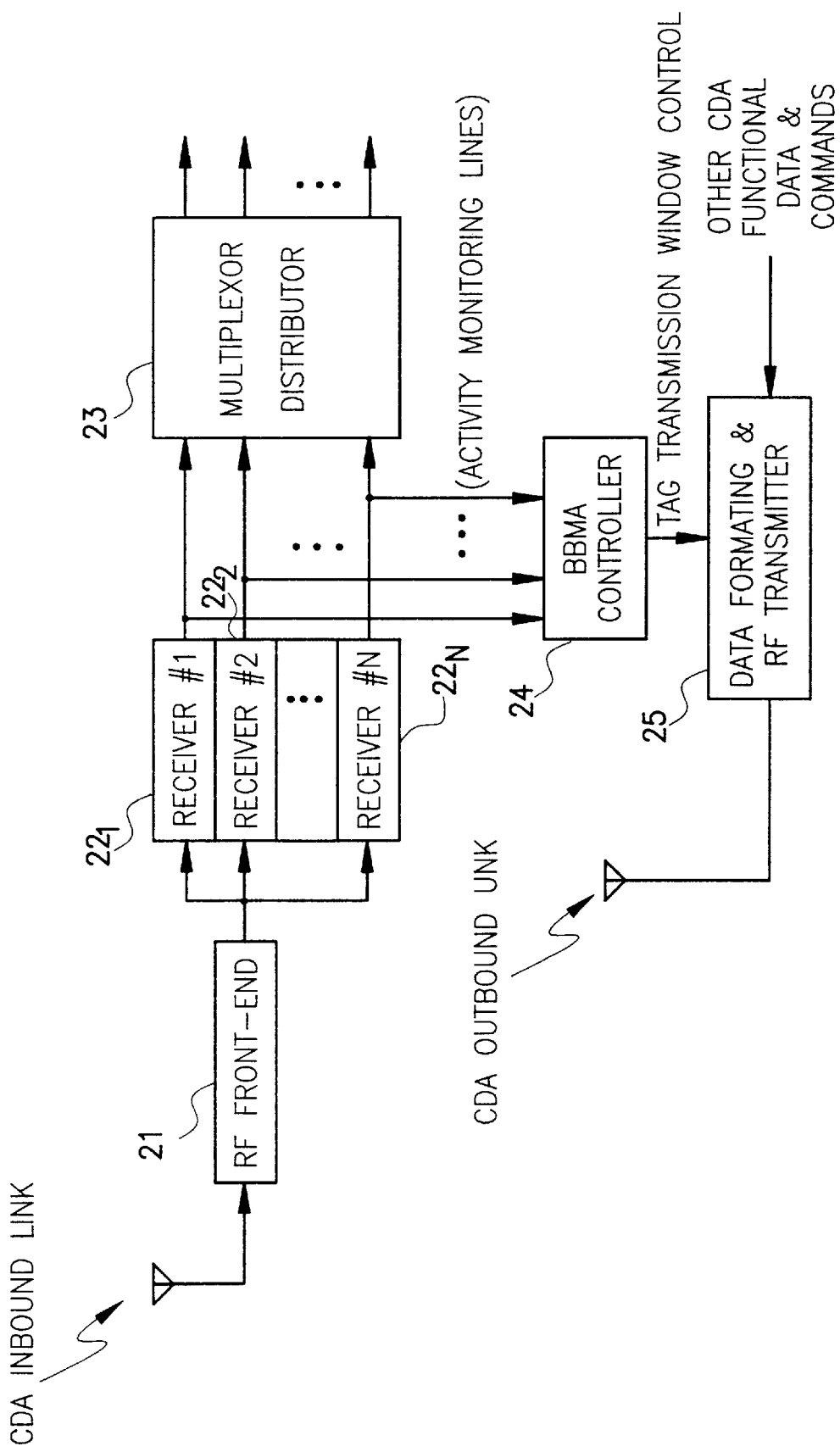
FIG. 3 is a block diagram of that portion of the central station which implements the DBMA protocol according to the invention.

FIG. 3 is a block diagram of that portion of the central station that implements the protocol of this invention. The inbound link from satellite 18 (FIG. 2) is received by the RF front-end 21, the output of which is distributed to a plurality of receivers $22_1, 22_2, \ldots 22_N$. The outputs of these receivers are input to a multiplexer/distributor 23 for further processing. The outputs are additionally input a DBMA controller 24 which generates a TAG transmission widow control signal that is dependent on the number and quality of TAG transmissions received. This window control signal is formatted with other central station data and commands and transmitted by RF transmitter 25 to the TAGs via the satellite 18 (FIG. 2).

The general requirements for the little LEO/TAG protocol according to the invention are the following:

i. The protocol is two-way; i.e., it supports transmission to and from a central facility.

ii. The protocol accommodates a large number of TAGs and is scalable so that TAGs can be added or deleted without impacting normal service.

iii. The protocol accommodates variable length messages. The variable length may arise from a number of considerations. The individual TAG may, for example, have extra sensor data to report in addition to, for example, its location.

iv. The protocol has a chatter suppression feature which will allow selective turn-off of a specific malfunctioning TAG's transmitter.

v. The protocol is designed in such a way that encryption or a privacy feature may be added later without significantly impacting the capacity.

vi. The protocol is robust in the sense that an asset is able to enter the system at any time without knowledge that cannot be gleaned following its entry into the system. The protocol also tolerates occasional transmission errors. The protocol is stable and exhibits a performance that degrades gracefully under additional load.

vii. The protocol does not require the TAGs to be receiving all the time but accommodate a listening watch period duty cycle significantly less than 100%.

viii. The protocol is fitted with appropriate "hooks and handles" so that it may be modified, perhaps remotely, while in service.

The object of this invention is to allow TAGs to be programmed via the outbound link to respond, if they have data to send, when they measure a certain Doppler offset or Doppler rate condition.

EXAMPLE 1

A LEO satellite was simulated with the following elements:

Inclination=57°

Figure 4A:
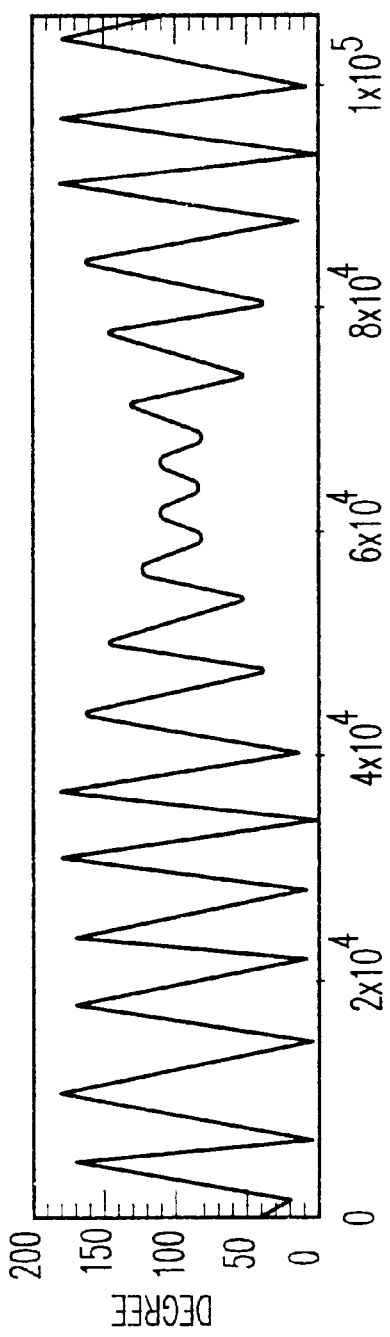
FIGS. 4A and 4B are graphs showing Doppler history for a first example.
Figure 4B:
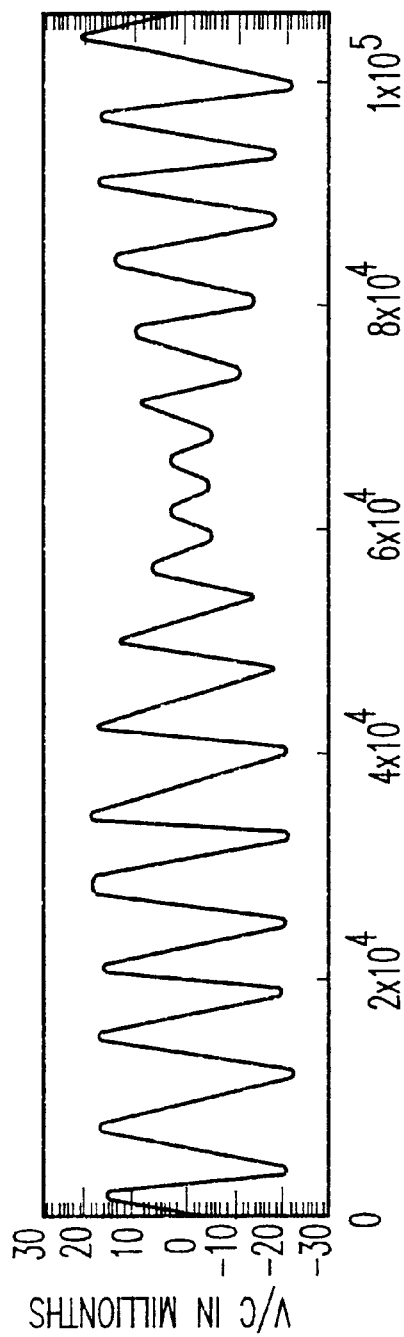
Figure 5A:
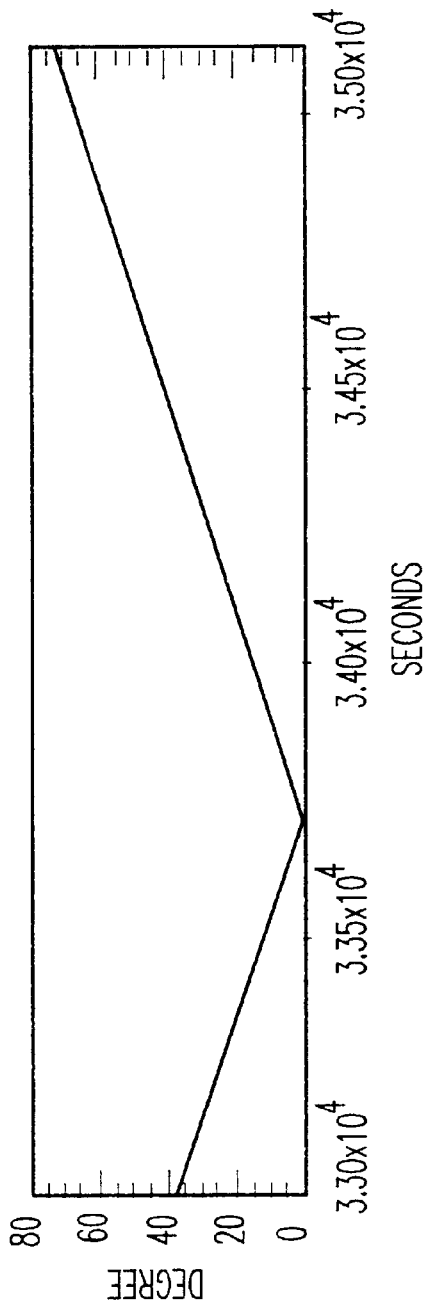
FIGS. 5A and 5B are graphs showing finer resolutions of the graphs of FIGS. 4A and 4B for a nearly overhead pass.
Figure 5B:
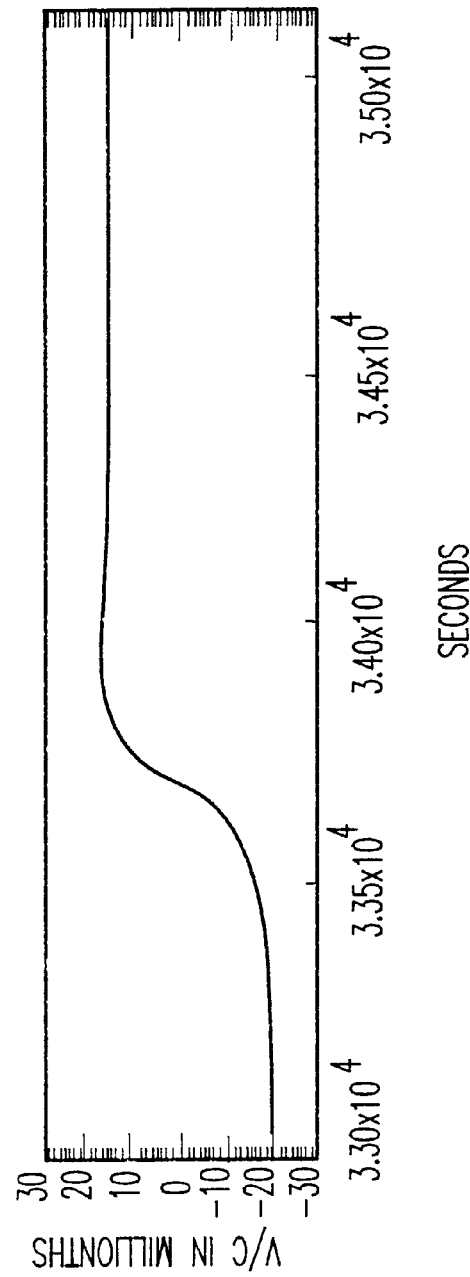
Figure 6A:
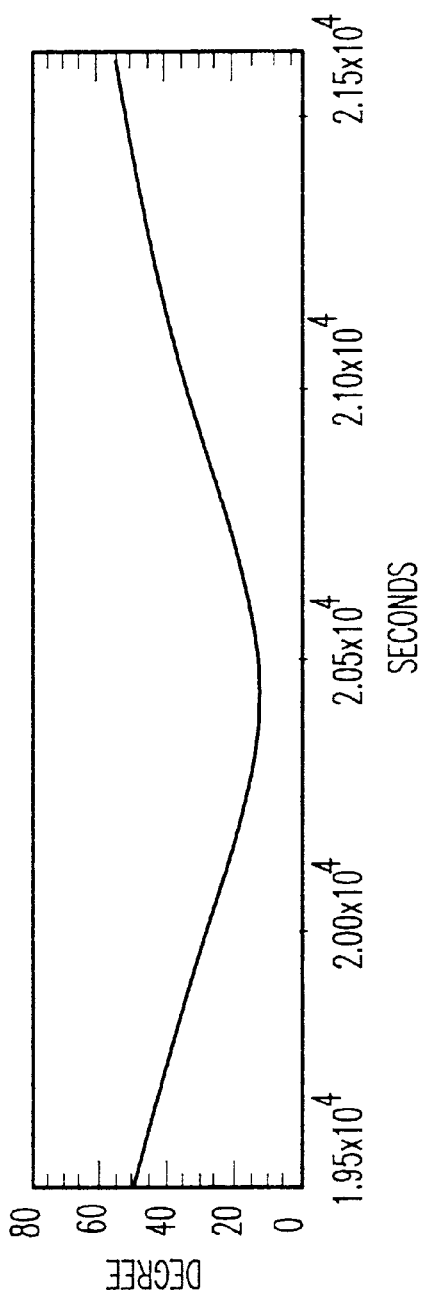
FIGS. 6A and 6B are graphs showing finer resolutions of the graphs of FIGS. 4A and 4B for a non-near overhead pass.
Figure 6B:
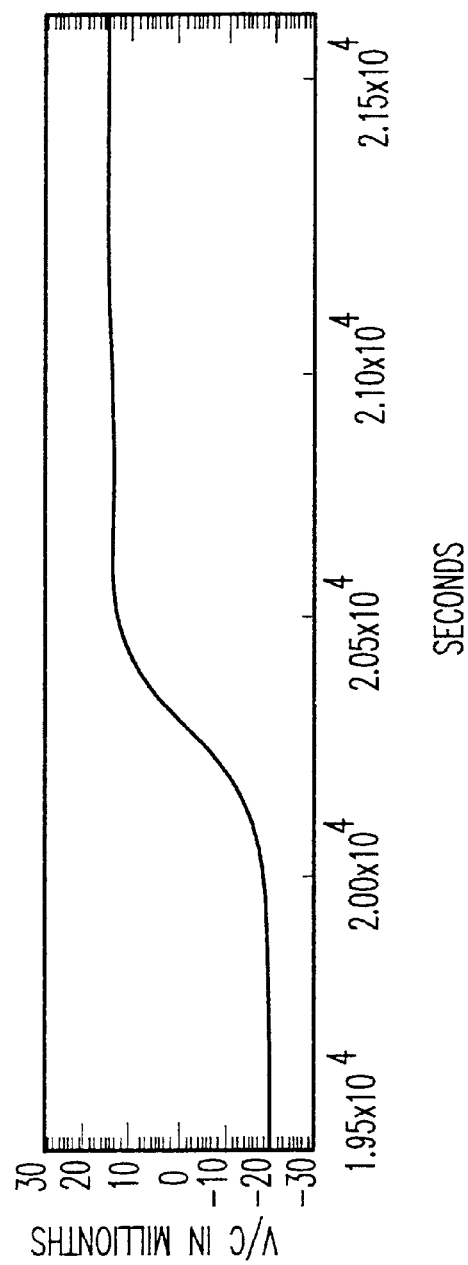

Orbit altitude=1000 kilometers,

Eccentricity=0 (circular orbit), interacting with a central station at latitude of 45°. The graphs in FIGS. 4A and 4B display Doppler history for a little over one day's results. The graph in FIG. 4A is the angle between a vector from the center of the earth to the central station and a vector from the center of the earth to the satellite. When this angle is near zero, the satellite is near overhead. The graph in FIG. 4B displays the dimensionless v/c where v is the relative velocity between the satellite and the central station and c is the speed of light. The graphs in FIGS. 5A, 5B and 6A, 6B are fine resolutions of particular segments of the graphs in FIGS. 4A and 4B showing the different Doppler behavior for a nearly overhead pass, FIGS. 5A, 5B, and a pass that is not nearly overhead, FIGS. 6A, 6B.

EXAMPLE 2

A LEO satellite was simulated with the following elements:

Inclination=53°

Orbit altitude=1000 kilometers

Eccentricity=0 (circular orbit) interacting with a central station. In order to send its data, a TAG must be in view of a satellite which must, itself, be in view of the central station.

Figure 7:
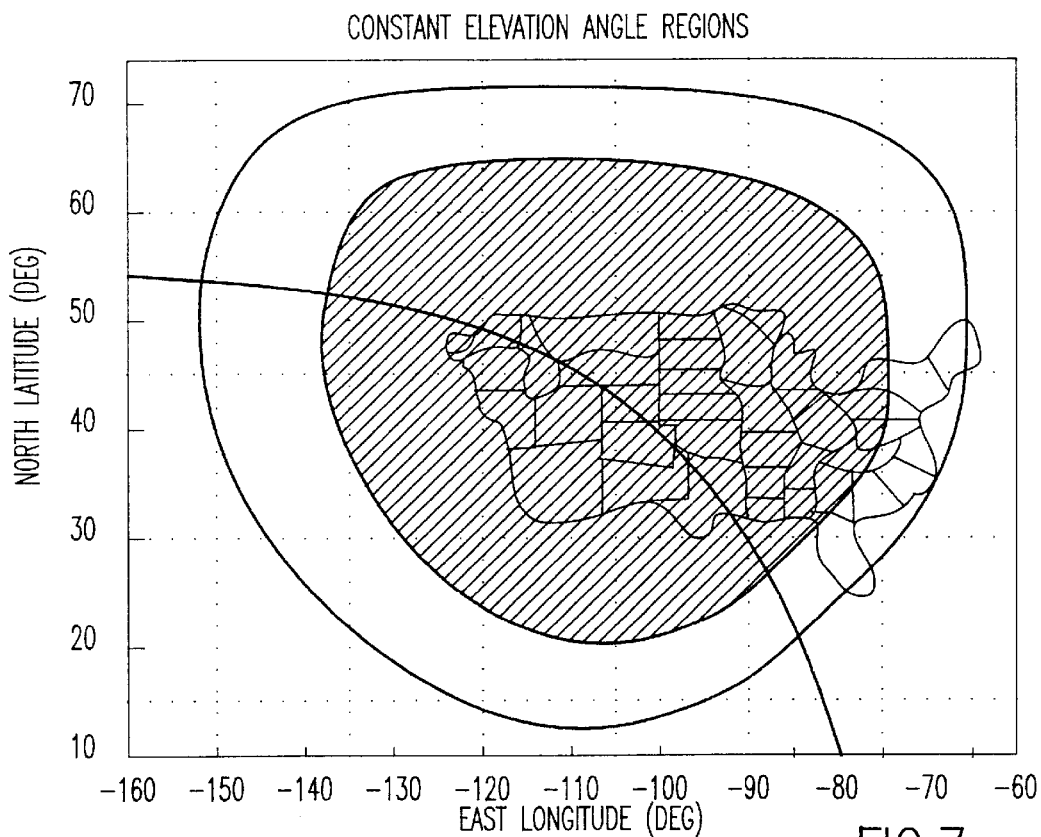
FIG. 7 is a map showing constant elevation regions of a simulated satellite.

FIG. 7 shows a ground trace and constant elevation angle contours of a satellite with the elements listed above. (It is assumed that the central station is appropriately situated for the satellite.) The constant elevation contours are shown, in the order of decreasing radii of contour, for satellite elevations to potential TAGs of 0°, 30°, 50°, and 70° when the subsatellite point, marked by an X, is on the border between Utah and Idaho. The 10° elevation region is shaded. All TAGs in the shaded region have elevation angle greater than 10° to the satellite.

We now introduce two key definitions:

i. $\theta°$ Visibility Region: This is defined as the region on the earth's surface from which the elevation angle to the satellite is at least $\theta°$.

For example, the 10° visibility region is shaded in FIG. 7 when the subsatellite point, marked by an X is on the border between Utah and Idaho as shown. The visibility region is only defined at each time instant. It moves with the satellite in its rotation around the earth.

ii. $\alpha°$ Swath: The $\alpha°$ swath of a satellite is defied as the region on the earth around the subsatellite path within the $\theta°$ visibility region, from which the maximum observable elevation angle at the TAG over time is at least $\alpha°$.

Figure 8:
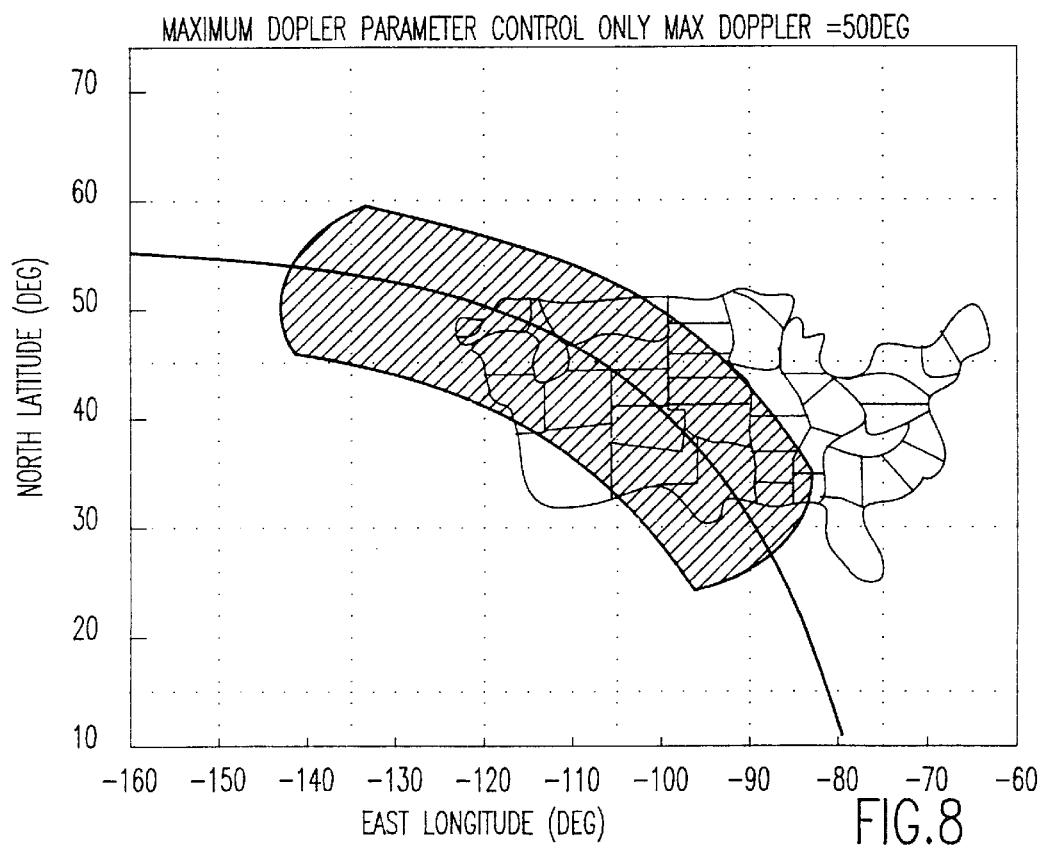
FIG. 8 is a map similar to that of FIG. 7 showing Doppler parameter control for a minimum elevation of 50°.
Figure 9:
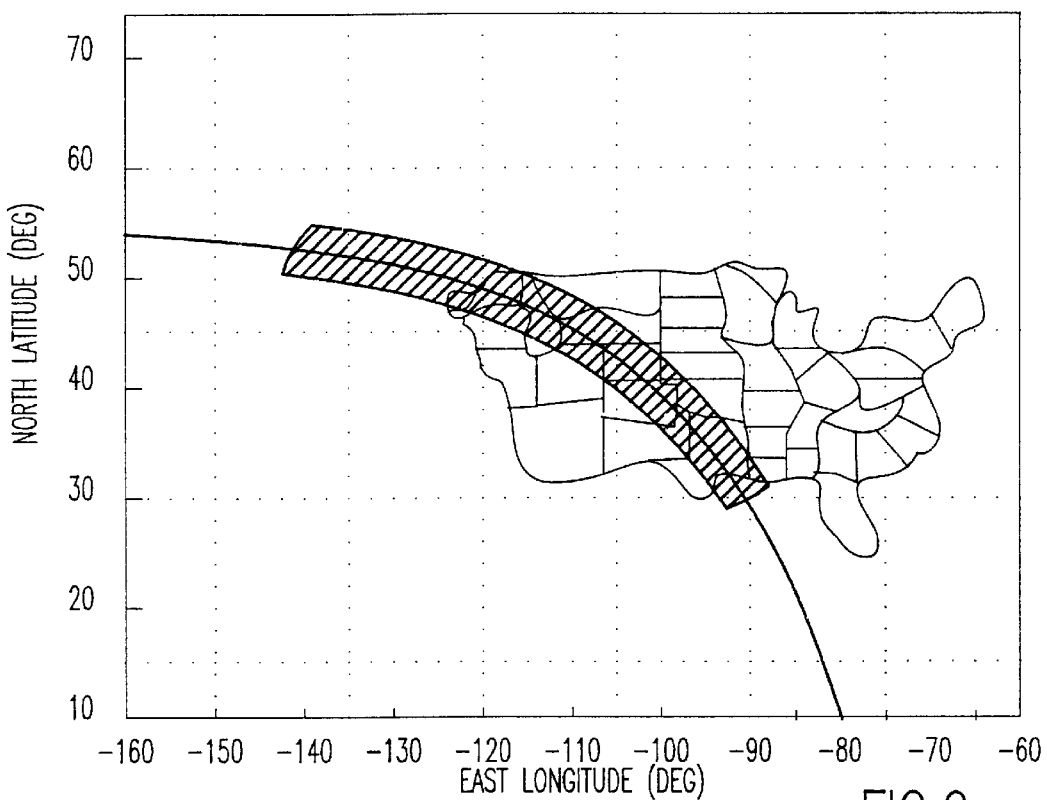
FIG. 9 is a map showing Doppler parameter control for a minimum elevation of 70°.

If TAGs are permitted to transmit when the satellite is at an elevation of 10° or higher, then it is clear that as the "swath" of the satellite coverage sweeps across the land mass, the number of TAG transmissions could be very great at different moments. However, if we allow only those TAGs to transmit for which (1) the elevation angle to the satellite is greater than 10° and (2) the maximum elevation angle observable during the current pass of the satellite is at least 50° (50° swath region), then only those TAGs which are in the shaded region of FIG. 8 will be permitted to transmit. FIG. 9 shows the case where the transmissions are restricted to those TAGs within the 10° visibility region and 70° swath region.

Figure 10:
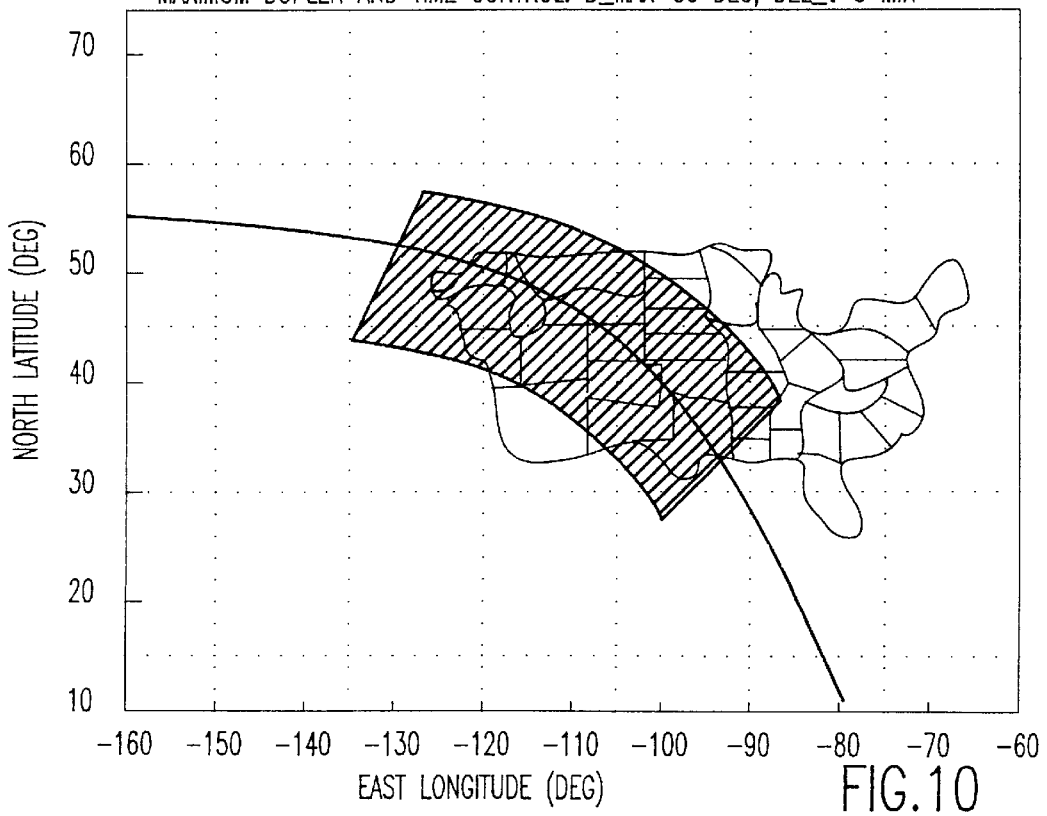
FIG. 10 is a map similar to that of FIG. 7 showing both Doppler and time control for a ten minute time window.
Figure 11:
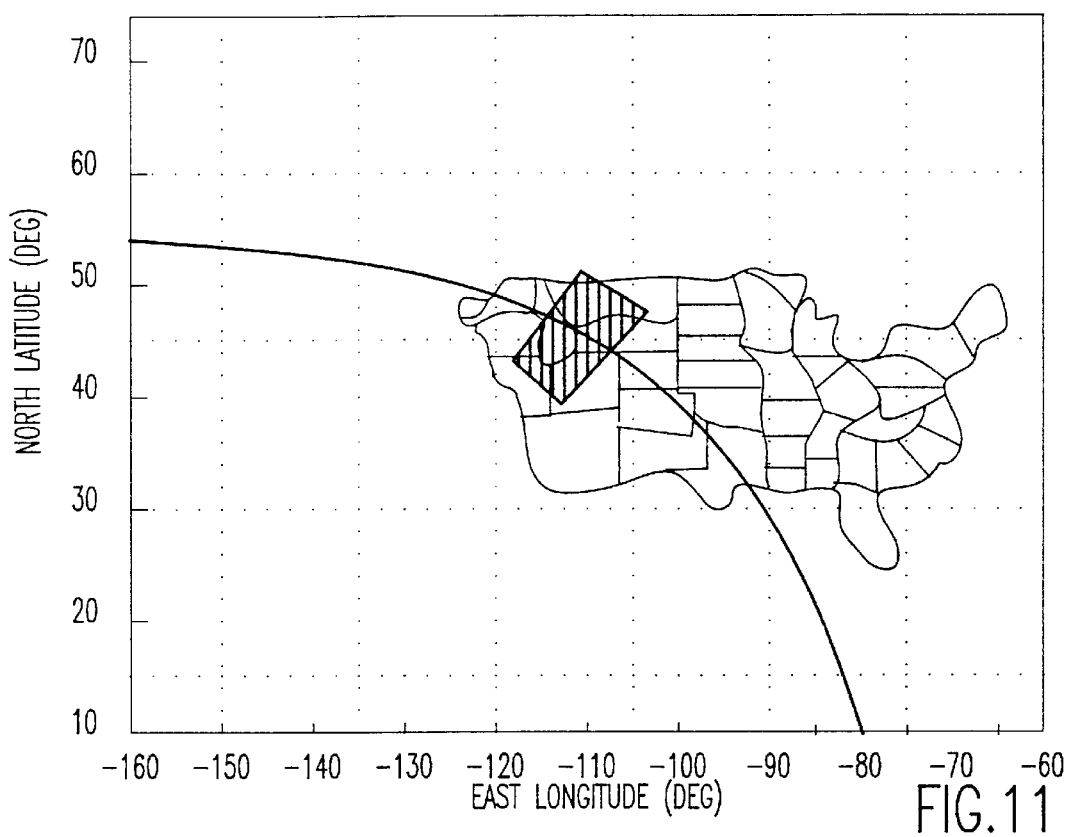
FIG. 11 is a map showing both Doppler and time control for a two minute window.

We now add an additional constraint, i.e., the time window during which a TAG may transmit. FIG. 10 shows the case for 50° swath and the condition that the TAG must transmit within five minutes of the closest approach of the satellite to the TAG. FIG. 11 shows the case for 50° swath and the condition that the TAG must transmit within one minute of the closest approach of the satellite to the TAG.

For both of these plots, the subsatellite point is on the border between Utah and Idaho.

Note that the protocol can bet "steered" to emphasize collection from TAGs that are off the side of the satellite's earth track. To do this, we restrict transmissions to TAGs which see the satellite at an elevation between certain limits; e.g., between 50° and 70°. The swath and time control could be used to cover different regions within the $\theta°$ visibility region of the satellite.

TAGs can also be commanded to transmit to the satellite based on estimates of the instantaneous elevation angle. If TAGs are permitted to transmit only if their instantaneous elevation angle is in a predefined range, this corresponds to coverage regions which are shaped in the form of circular bands around the subsatellite point. The advantage of this type of control is that the power arriving from each of the TAGs can be restricted to be within a fixed range. Such power equalizing is important for some multiple access formats, such as CDMA (code division multiple access), FDMA (frequency division multiple access), and hybrid FDMA/TDMA (time division multiple access).

The estimation of the instantaneous elevation angle at a tag can be done through a two stage process: (1) At first the tag estimates the maximum elevation angle it is going to observe (An embodiment of doing this has been provided here) and (2) The tag can then map the observed Doppler at the instant to the corresponding elevation angle. Doppler rate estimation can be further used to improve the estimation process.

Implementation

For the above multiple access method to work, we must know or estimate the maximum elevation angle of the satellite as seen from a particular TAG. We must also estimate or be able to compute the time of closest passage of the satellite to a particular TAG.

This can be done in a straightforward manner by exploiting the Doppler "S-curve." This is the curve relating observed satellite forward channel Doppler shift to the TAG. The Doppler shift will be a function of the satellite velocity with respect to the TAG. The Doppler shift will be at a maximum when the satellite first becomes visible. The Doppler shift will decrease to zero as the satellite reaches its point of closest approach to the TAG. The Doppler shift will then become negative and will be at a maximum negative value when the satellite disappears from view.

Figure 12:
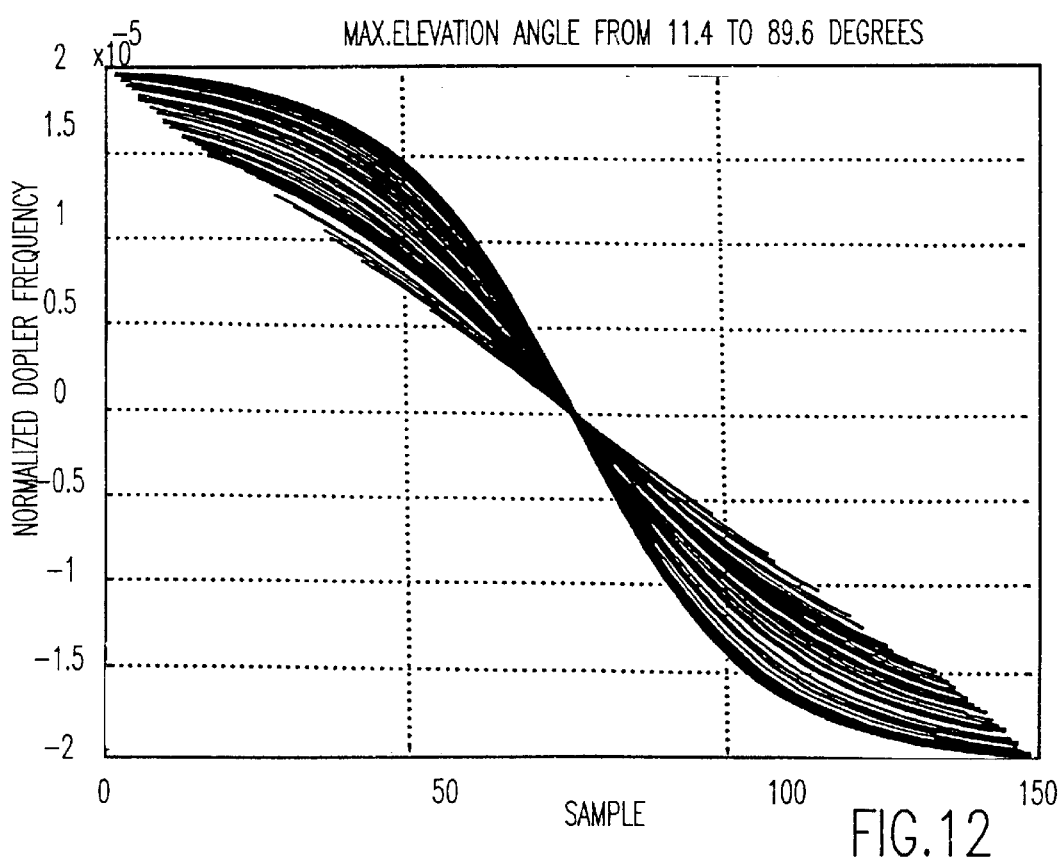
FIG. 12 is a graph of time derivatives of Doppler S-curves.

The set of graphs in FIG. 12 show a family of curves for maximum elevation angles in the range 11.4° to 89.6°. The higher the maximum angle of elevation, the larger the magnitude of the derivative at the point of inflection which is the point of closest approach or zero Doppler shift.

We have found that we can estimate a satellite's S-curve from Doppler values measured well before the point of inflection. From this we can estimate the maximum elevation angle and the time to closest approach (zero Doppler shift). From these two estimates we can control a TAG's permission to transmit and the window of time in which it may transmit. These control values are broadcast to all the TAGs by the central station, and the TAGs make the computations based on measured Doppler shift to determine their eligibility to transmit and the window of time during which they may transmit.

Figure 13:
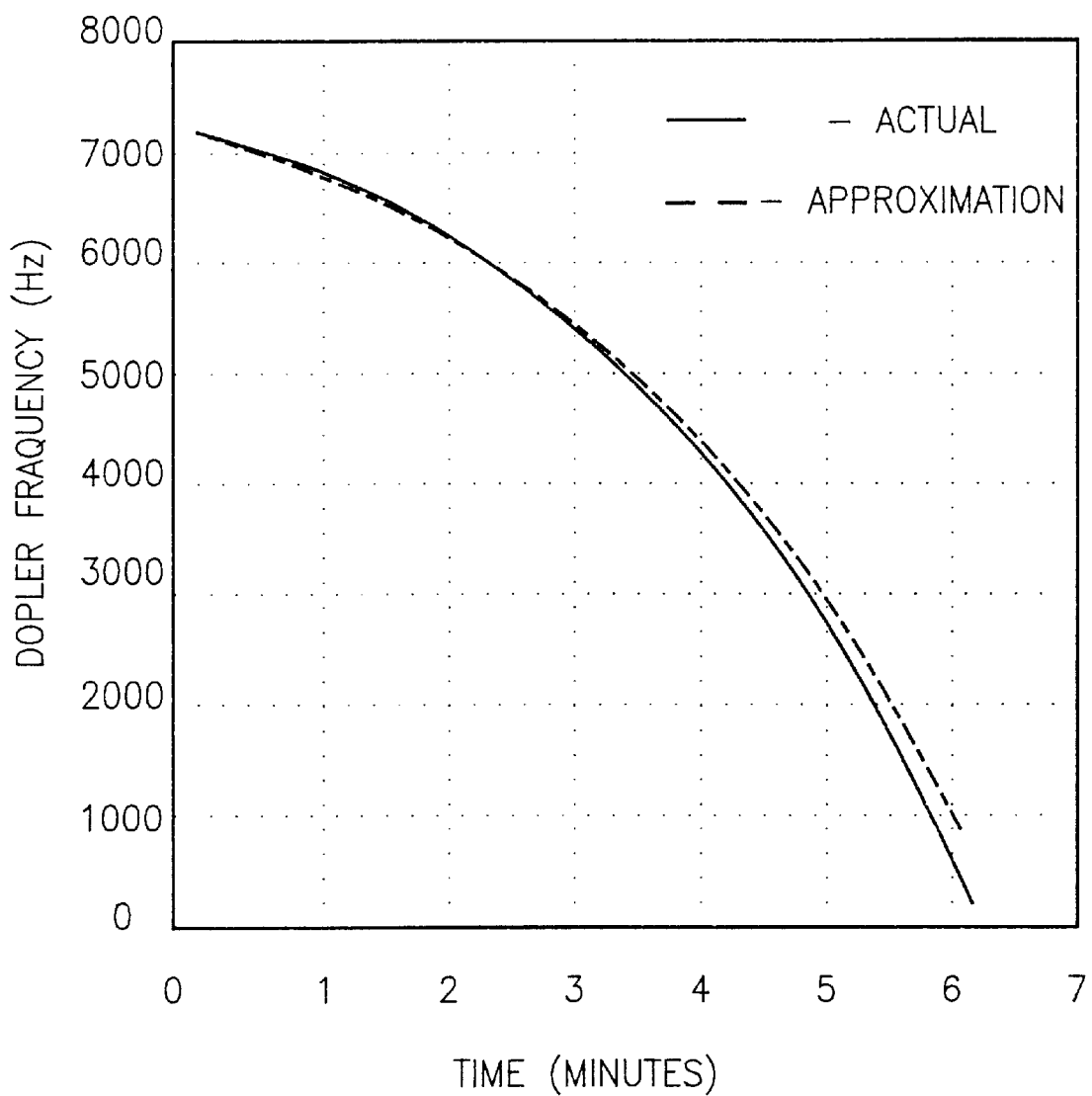
FIG. 13 is a graph of a quadratic curve fit to a Doppler S-curve for 39.4° maximum elevation.
Figure 14:
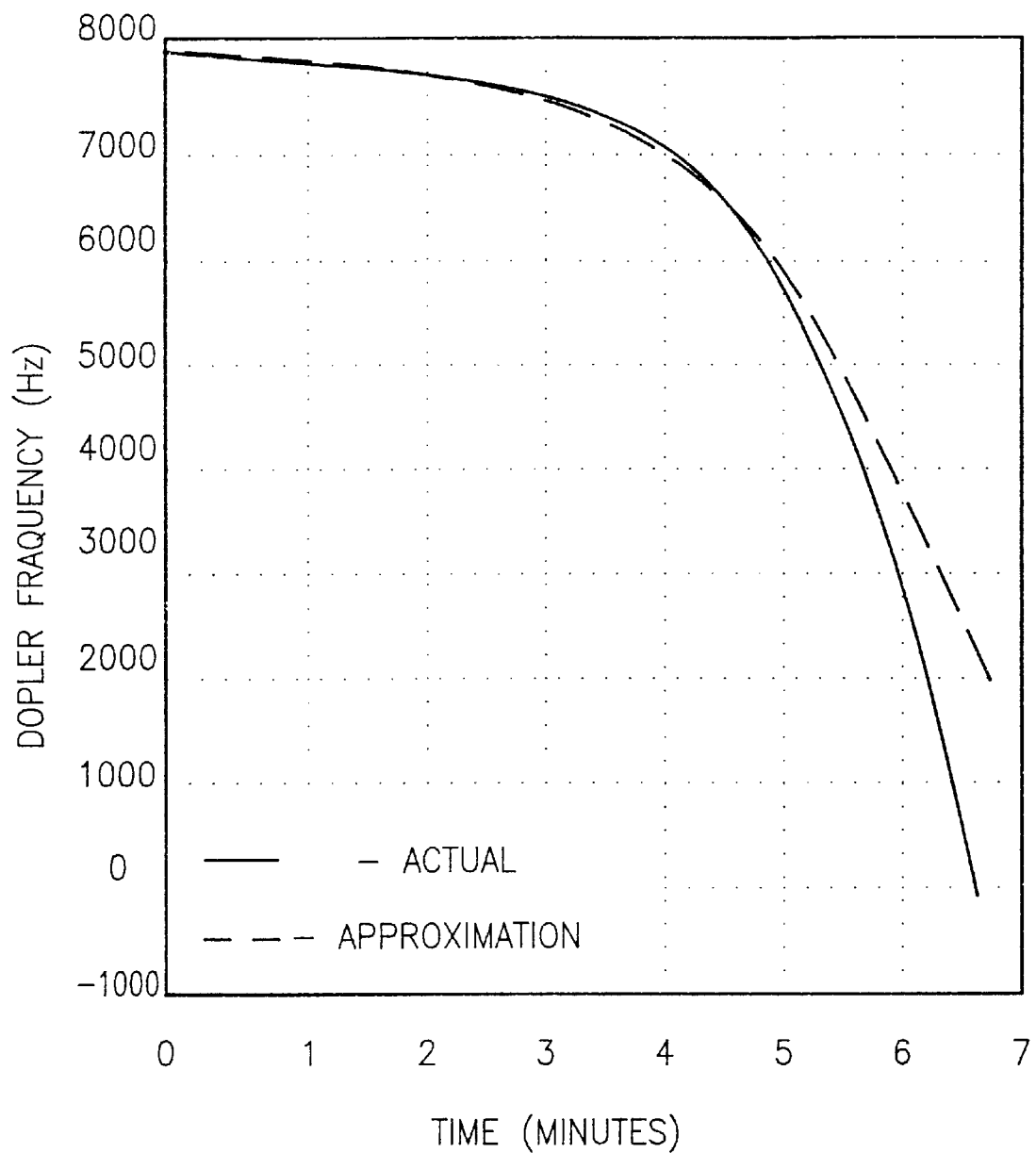
FIG. 14 is a graph of a quadratic curve fit to a Doppler S-curve for 68.2° maximum elevation.
Figure 15:
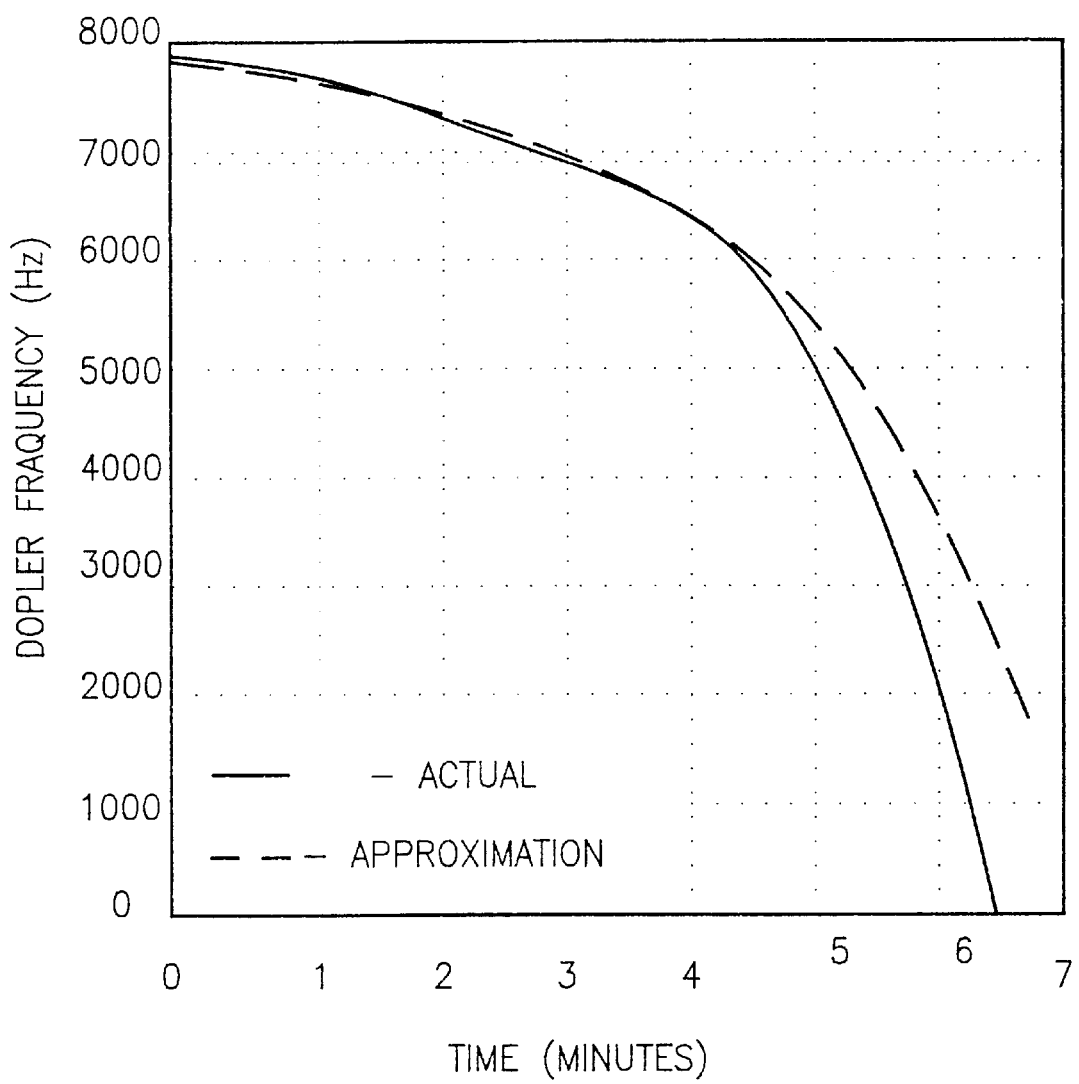
FIG. 15 is a graph of a quadratic curve fit to a Doppler S-curve for 89.6° maximum elevation.

FIGS. 13 to 15 show examples of quadratic curve fitting to S-curves for the three maximum elevation angles of 39.4°, 68.2°, and 89.6°, respectively.

Figure 16:
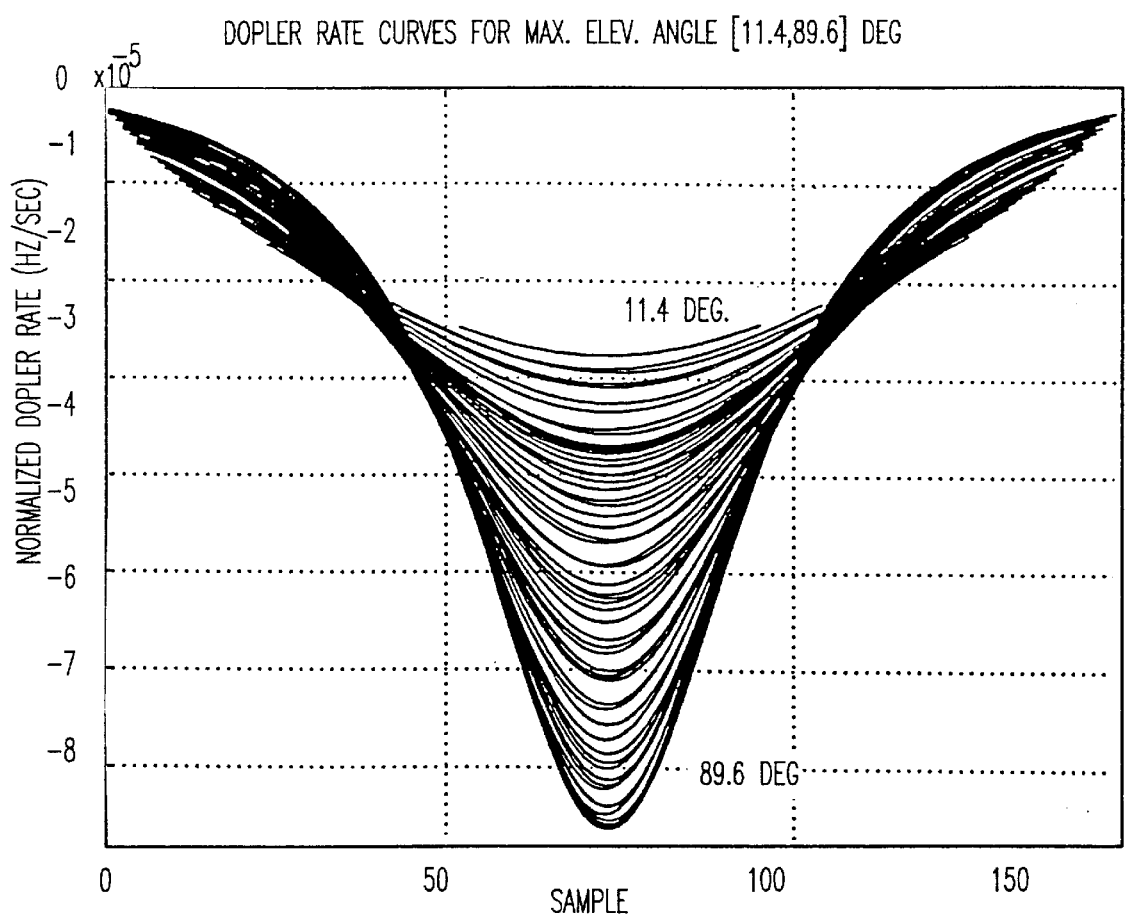
FIG. 16 is a graph of time derivatives of the curves of FIG. 12.

If the TAG's local oscillator is not sufficiently accurate for implementing DBMA directly, i.e., by using the Doppler shift, it is possible to use Doppler-rate. FIG. 16 shows the time derivatives of the curves shown in FIG. 12.

Figure 17:
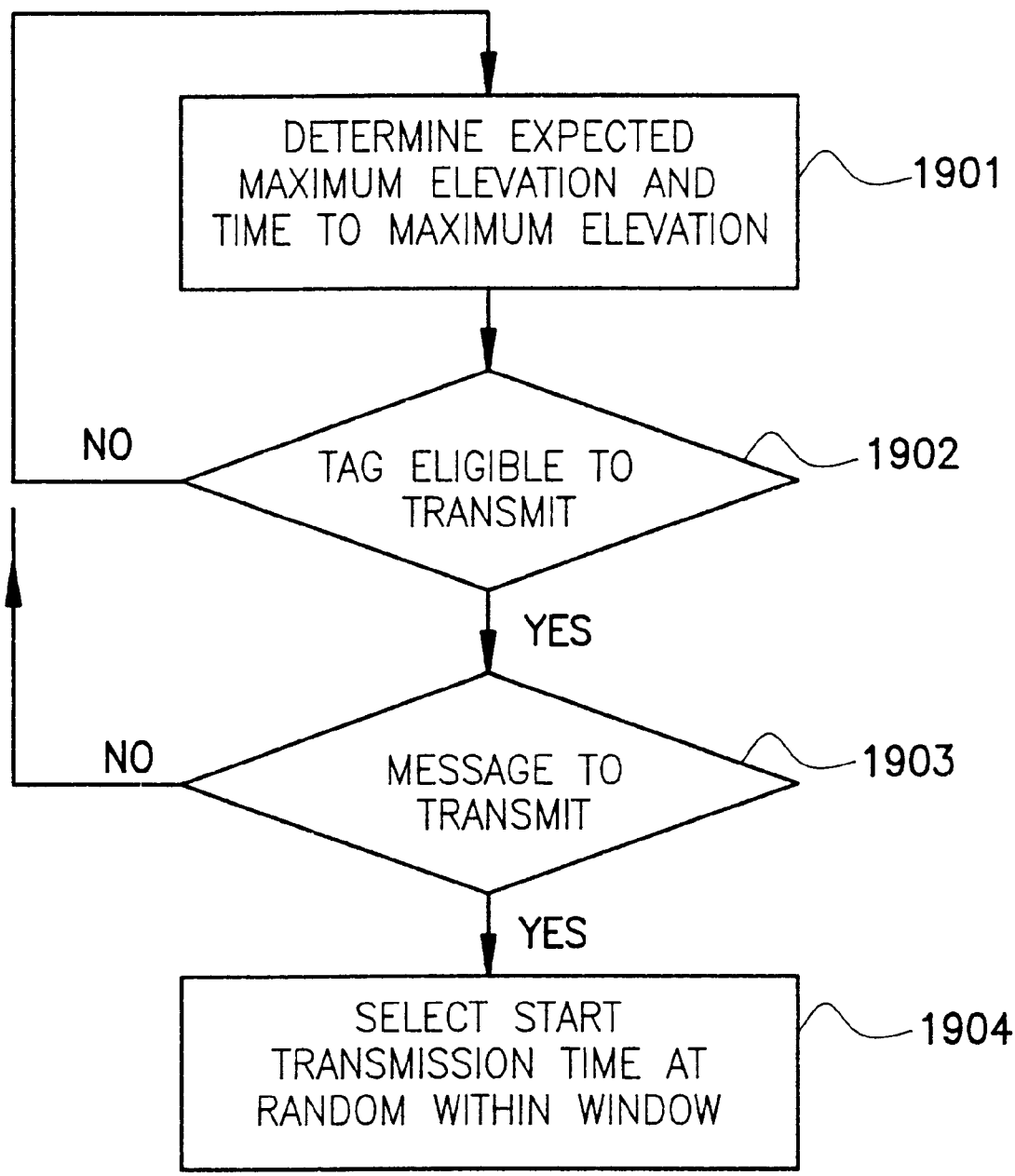
FIG. 17 is a flow diagram showing the subprocess of the DBMA protocol according to the invention at a TAG.
Figure 18:
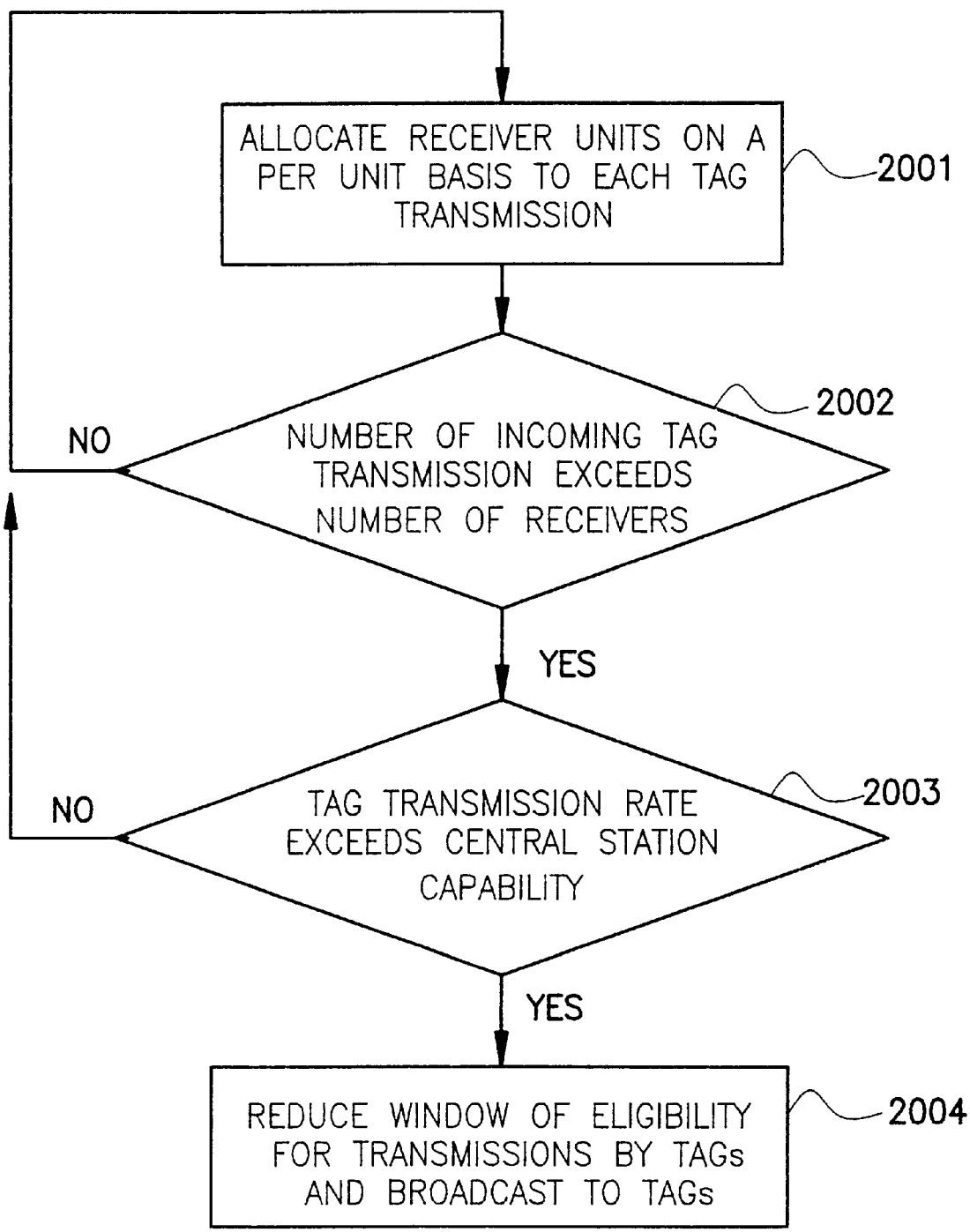
FIG. 18 is a flow diagram showing the subprocess at of the DBMA protocol according to the invention at the central station.

FIGS. 17 and 18 illustrate the two subprocesses which comprise the DBMA protocol according to the invention. The first of these subprocesses is shown in FIG. 17 for the TAG.

As a satellite comes into common view of a TAG and the central station, the TAG determines the expected maximum elevation of the satellite to the TAG and the time to the maximum elevation of the satellite in function block 1901. The TAG monitors the central station outbound link in decision block 1902 to determine the TAG's eligibility to transmit should it have a message waiting in the transmit queue. This eligibility is based on an allowable window for start of transmission with allowable limits on the maximum elevation of the satellite and a time interval centered at the time of the satellite's maximum elevation. If the TAG has a message to transmit, as determined in decision block 1903, and if it is eligible to transmit during the present satellite pass, as determined in decision block 1902, the TAG selects a start transmission time at random within the available time window of eligibility in function block 1904.

The subprocess at the central station is shown in FIG. 18. The central station has a limited number of receiver units ($22_1$ to $22_N$ in FIG. 3) which it allocates on a per unit basis to each TAG transmission in function block 2001. If the number of incoming TAG transmissions exceeds this number as determined in decision block 2002, then those TAG messages which are not assigned a receiver unit will be lost and further result in a greater multiple access interference (MAI) noise potentially degrading the transmissions processed by the appropriated receiver units. The central station monitors the TAG transmission rate. If this rate exceeds the capability of the central station to process this rate as determined in decision block 2003, the central station reduces the window of eligibility for transmissions and broadcasts this restriction to the TAGs in function block 2004. The central station may control the window of eligibility by allowing TAGs to transmit only if the maximum angle of elevation falls within a tighter set of limits. The central station may also adjust the TAG transmission rate by changing limits of the time window around the time of maximum elevation.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A Doppler-Based Multiple Access (DBMA) protocol method for use in a Low Earth Orbit (LEO) satellite system composed of satellites that transpond, in real time or near real time, transmissions received in an uplink frequency band, said protocol method comprising the steps of:
   at a central station, assigning a plurality of receiver units to transceivers which from time to time transmit data to the central station;
   detecting at the central station whether a number of transmissions from the transceivers is near maximum capacity of the central station;
   adjusting at the central station windows of eligibility for transmissions by the transceivers to insure near maximum capacity and broadcasting the windows of eligibility to the transceivers; and
   at each transceiver, observing a Doppler frequency shift of a LEO satellite and controlling transmissions from the transceiver according to the window of eligibility broadcast from the central station for the transceiver.

2. The DBMA protocol method recited in claim 1 wherein the windows of eligibility is defined by a Doppler frequency shift and a time window.

3. The DBMA protocol method recited in claim 2 wherein the transceiver determines windows of eligibility for transmissions by curve fitting techniques for mapping Doppler frequency measurements to an estimation of maximum elevation angle of to the satellite.

4. The DBMA protocol method recited in claim 3 wherein the central station adjusts windows of eligibility in order that transmissions from transceivers arrive at the satellite at approximately equal received powers.

5. The DBMA protocol method recited in claim 3 wherein the central station adjusts windows of eligibility by establishing a time interval centered at a time of the satellite's computed estimation of maximum elevation angle.

6. The DBMA protocol method recited in claim 5 wherein each transceiver controls transmissions by selecting a starting time at random within the window of eligibility for the transceiver.

7. The DBMA protocol method recited in claim 5 further comprising the steps of:
   monitoring at the central station a transmission rate from the transceivers;
   determining at the central station whether the transmission rate exceeds a capability of the central station to process transmissions from the transceivers; and
   if the transmission rate exceeds the capability of the central station to process transmissions, then reducing by the central station the windows of eligibility for transmissions and broadcasting the reduced windows of eligibility to the transceivers.

8. A Low Earth Orbit (LEO) satellite communication system implementing a Doppler-Based Multiple Access (DBMA) protocol method comprising:
   a plurality of LEO satellites that transpond, in real time or near real time, transmissions received in an uplink frequency band;
   a central station having a plurality of receiver units assigned to transceivers which from time to time transmit data to the central station, said central station detecting whether a number of transmissions from the transceivers is near maximum capacity of the central station and adjusting windows of eligibility for transmissions by the transceivers to insure near maximum capacity and broadcasting the windows of eligibility to the transceivers; and
   a plurality of transceivers which communicate with the central station via the LEO satellites, each transceiver observing a Doppler frequency shift of a LEO satellite and controlling transmissions from the transceiver according to the window of eligibility broadcast from the central station for the transceiver.

9. The LEO satellite communication system recited in claim 8 wherein the windows of eligibility is defined by a Doppler frequency shift and a time window.

10. The LEO satellite communication system recited in claim 9 wherein the transceiver determines windows of eligibility for transmissions by curve fitting techniques for mapping Doppler frequency measurements to an estimation of maximum elevation angle of to the satellite.

11. The LEO satellite communication system recited in claim 10 wherein the central station adjusts windows of eligibility in order that transmissions from transceivers arrive at the satellite at approximately equal received powers.

12. The LEO satellite communication system recited in claim 10 wherein the central station adjusts windows of eligibility by establishing a time interval centered at a time of the satellite's computed estimation of maximum elevation angle.

13. The LEO satellite communication system recited in claim 12 wherein each transceiver controls transmissions by selecting a starting time at random within the window of eligibility for the transceiver.

14. The LEO satellite communication system recited in claim 12 wherein the central station monitors a transmission rate from the transceivers, determines whether the transmission rate exceeds a capability of the central station to process transmissions from the transceivers, and if the transmission rate exceeds the capability of the central station to process transmissions, then reduces the windows of eligibility for transmissions and broadcasts the reduced windows of eligibility to the transceivers.

* * * * *